United States Patent [19]

Comon

[11] Patent Number: 5,315,532
[45] Date of Patent: May 24, 1994

[54] METHOD AND DEVICE FOR REAL-TIME SIGNAL SEPARATION

[75] Inventor: Pierre Comon, Nice, France

[73] Assignee: Thomson-CSF, Puteaux, France

[21] Appl. No.: 854,648

[22] PCT Filed: Dec. 20, 1990

[86] PCT No.: PCT/FR90/00932
  § 371 Date: Jul. 8, 1992
  § 102(e) Date: Jul. 8, 1992

[87] PCT Pub. No.: WO91/11037
  PCT Pub. Date: Jul. 25, 1991

[30] Foreign Application Priority Data

Jan. 16, 1990 [FR] France ................. 90 00436

[51] Int. Cl.[5] .............................................. G06F 15/20
[52] U.S. Cl. ................................................. 364/553
[58] Field of Search ................. 364/553, 572; 371/18

[56] References Cited

U.S. PATENT DOCUMENTS 3,751,596 8/1973 Tseng .................................. 370/18
4,947,480 8/1990 Lewis .................................. 364/572

FOREIGN PATENT DOCUMENTS 0189655 8/1986 European Pat. Off. .

OTHER PUBLICATIONS

New Methods for Signal Separation Fety et al., 1988 (no month), pp. 226-230.
Co-Channel Interference Suppression and Signal Separation Method, Bar-Ness et al., 1988 (no month), pp. 1077-1081.
SPIE, Advanced Algorithms and Architectures for Signal Processing III, vol. 975, 1988, J. G. McWhirter et al.: "Efficient MVDR processing using a systolic array", pp. 385-392.
Traitement du Signal, vol. 5, No. 6, 1988, C. Jutten et al.: "Une solution neurominetique au probleme de separation de sources", pp. 389-403.
IEEE Transactions on Aerospace and Electronic Systems, vol. 25, No. 4, Jul. 4, 1989, IEEE, Plc., (New York, US), M. Yuen: "Algorithmic, architectural and beam pattern issues of sidelobe cancellation", pp. 459-471.

*Primary Examiner*—Jack B. Harvey
*Assistant Examiner*—Thomas Peeso
*Attorney, Agent, or Firm*—Oblon, Spivak, McClelland, Maier & Neustadt

[57] ABSTRACT

Method and device for real-time separation of signals received by a predetermined number of sensors, the mixture being linear. The signals received are firstly decorrelated [s(t)], and they are then introduced into a rotator which calculates, through a succession of elementary rotations [$Q^{(1)}, Q^{(2)}, \ldots Q^{(m)}$], the orthogonal matrix (Q) making it possible to recover the independent source-signals [x(t)] by multiplication (F) of this matrix (Q) by the decorrelated input signals [s(t)]. The identification of (Q) is based on the estimation of statistical magnitudes called "cumulants".

4 Claims, 2 Drawing Sheets

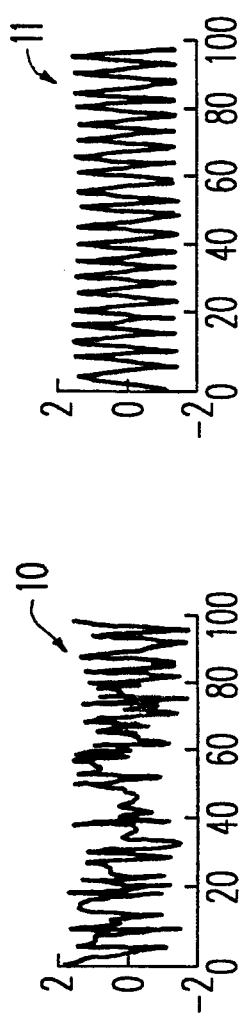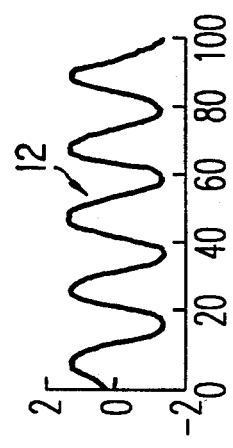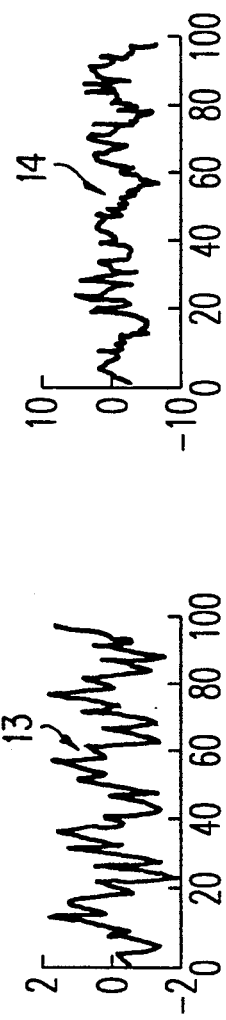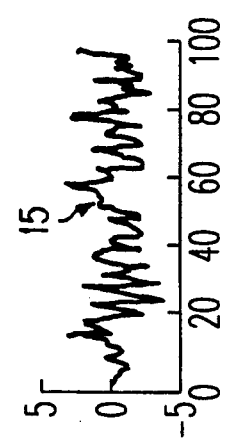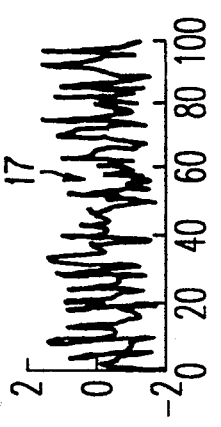

METHOD AND DEVICE FOR REAL-TIME SIGNAL SEPARATION

BACKGROUND OF THE INVENTION

1. Field of the Invention

The present invention relates to a method and a device for real-time separation of mixed signals.

2. Discussion of the Related Art

The problem posed is the blind identification of a mixture of signals. Signals are received on a certain number of sensors, equal to p in number for example. These signals come from a mixture, which is by assumption linear but whose transfer function is unknown, of a number n less than or equal to p of "source" signals which are also unknown, and which, also by assumption, come from independent and non-Gaussian (except strictly for one of them alone) sources. It therefore involves at the same time separating, that is to say identifying, these source signals and determining the transfer function effecting the mixture of signal which are received on the p abovementioned sensors: it is therefore a problem of blind deconvolution.

Taking the simple example from the field of radar of sonar, the signals received by the sensors which together constitute the reception antenna, are generally processed to form channels in directions chosen a priori, this making it possible to spatially separate "sources" constituted by echoes or noise-makers. The problem posed here is to identify there channels directly.

Thus, to fix ideas, if two sources $x_1(t)$ and $x_2(t)$, where t is the time variable, and two sensors providing two signals $e_1(t)$ and $e_2(t)$ such that:

$$e_1(t) = x_1(t) + \beta x_2(t)$$

$$e_2(t) = \alpha x_1(t) + x_2(t)$$

are considered, if it is then possible to obtain $\alpha$ and $\beta$, that is to say to identify the transform matrix:

$$\begin{pmatrix} 1 & \beta \\ \alpha & 1 \end{pmatrix}$$

the two channels $$e_1(t) - \beta e_2(t)$$

and $e_2(t) - \alpha e_1(t)$ are available which effect the desired separation of the source signals $x_1(t)$ and $x_2(t)$.

In this example, the source signals are taken at the same instant t: the mixture of signals is termed "instantaneous". In general, mixtures are not instantaneous but "convolutive". It is nevertheless possible to reduce a convolutive problem to an instantaneous problem by decomposing the signals into signals with pure frequencies by spectral analysis obtained by FOURIER Transformation. Denoting the frequency by f, each observed signal can then be written:

$$e(t) = \sum_f e(t,f)$$

and each source signal can be written:

$$x(t) = \sum_f x(t,f)$$

Finally, the blind deconvolution problem to be solved here can be stated thus:

p signals (p greater than or equal to 2) are observed, and for which it is known that they arise from n unknown source signals (n less than or equal to p) through an unknown linear, stationary transformation A(f) such that:

$$e_i(t,f) = \sum_{j=1}^{j=n} A_{ij}(f) x_j(t,f))$$

with: $1 \leq i \leq p$, the signals e(t), x(t) and the transformation A possibly being complex data. Moreover, independent and, except strictly for one of them along, non-Gaussian sources are involved. Blind deconvolution then consists in the determination of the transfer function A and thereby of each of the source-signals.

A known solution for effecting a time separation of an instantaneous mixture $A(f) = A$ of signals is proposed by Messrs. C. JUTTEN and J. HERAULT in several articles including the one published in the French journal "Traitement du Signal", volume 5, No. 6, 1988, pages 389 to 403. In involves a method of separation which uses a fully interconnected signal-layer array of linear neurons whose weights are supervised by an algorithm akin to that of stochastic iteration.

This known method nevertheless has some disadvantages:

the algorithm used does not always converge, and it may therefore provide erroneous outputs, which would diverge if there were no natural saturation;

when there is convergence, the speed of convergence of this algorithm can be extremely slow;

whether or not convergence occurs depends on the initialization, as well as on the speed of convergence and on the solution provided.

SUMMARY OF THE INVENTION

The invention aims to remedy these disadvantages. To this effect it relates to a method of real-time separation of signals received by a predetermined number p of sensors, these signals coming from a linear mixture, but of unknown transfer function, of a number n less than or equal to p of source-signals which are also unknown and which come from independent and, except strictly for one of them, non-Gaussian sources, this method consisting in processing these received, sensed and sampled signals, in two steps, including:

a first step of obtaining, in a manner known per se, p decorrelated signals s(t) from these received signals e(t); and a second step of calculating an orthogonal matrix Q such that x(t)=Q s(t), x(t) being the required source-signals, this orthogonal matrix Q, which effects a linear transformation, being obtained from polynomial transformations of the data with the aid of polynomials of degree 3 or 4, and being determined, with the aid of a stochastic algorithm which stores average statistics called moments and cumulants, and which then uses these estimated moments and cumulants to effect the real-time determination of the matrix Q.

Preferably moreover, adjustable omission factors are introduced into the calculation to enable the separator to deal with variable, that is to say non-stationary phenomena.

If the p observed signals arise from a number n of source-signals which is less than p, the separator merely operates better: it then automatically supposes the existence of virtually-null fictitious sources, solely generating calculation errors.

BRIEF DESCRIPTION OF THE DRAWINGS

At any event, the invention will be better understood, and its advantages and other characteristics will emerge during the following description of a non-limiting exemplary embodiment, with reference to the attached diagrammatic drawing in which:

FIGS. 5a–c shows an example of three source-signals;

FIGS. 6a–c shows the three signals actually observed, corresponding to these three source-signals; and FIGS. 7a–c shows the signals obtained with the aid of the separator in accordance with the invention.

DETAILED DESCRIPTION OF THE PREFERRED EMBODIMENTS

Figure 1:
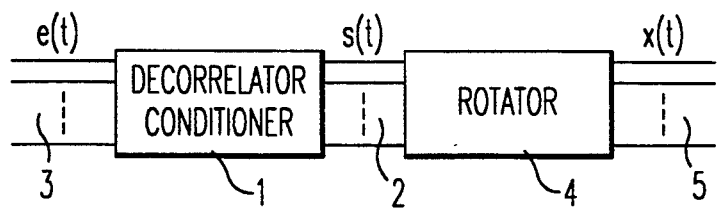
FIG. 1 is an overall synoptic diagram of the signal separator according to the invention.

Referring to FIG. 1, this real-time signal separator comprises a "decorrelator-conditioner" 1 able to provide, on its p outputs 2, p decorrelated signals s(t) from the p received, sensed and sampled signals e(t) which are applied to it on its p inputs (3). The operation of the decorrelator-conditioner 1 is well known per se, and is for example described in an article by J. G. WHIRTER and T. J. SHEPHERD published in "Proceedings SPIE", vol. 975, Advanced Algorithms and Architectures, San Diego, 1988, and also in a communication by P. COMON, GRETSI Colloquium, June 1989, Juan-Les-Pins, pages 137 to 140.

The p outputs s(t) at 2 are applied to a device 4 able to perform the calculation of the abovementioned orthogonal matrix Q, such that:

$$x(t) = Q.s(t)$$

x(t) being the required source-signals obtained at 5 on the p outputs of block 4.

This block 4 is here called the "rotator", since, as will be seen later, obtaining the orthogonal matrix Q amounts to identifying a rotation.

Figure 2:
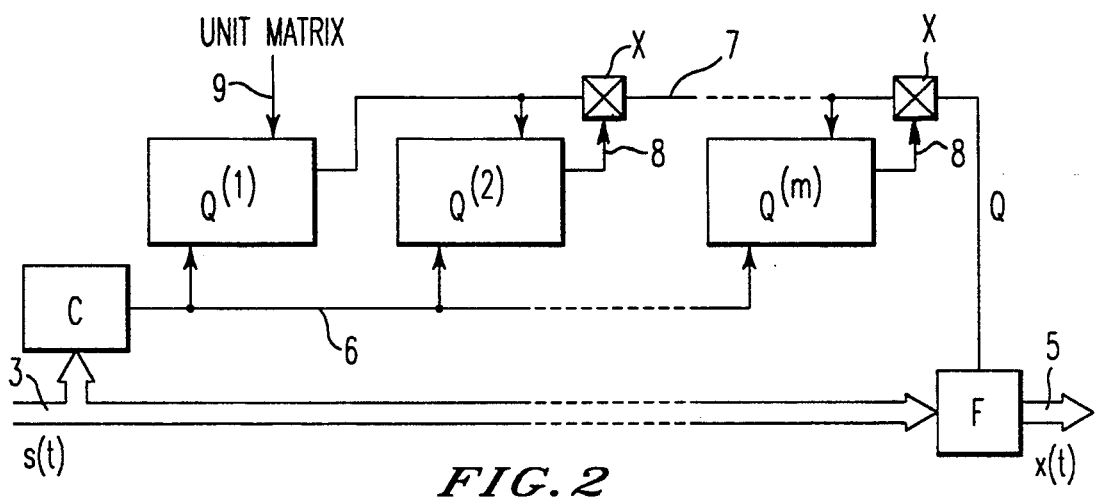
FIG. 2 is a synoptic diagram of the "rotator" used in the separator of FIG. 1.

The structure of the rotator is represented in FIG. 2. The p signals s(t) are processed in a calculation chain in order to obtain the matrix Q. In the cell denoted F, the product of Q times the signals s(t) is performed. The p output signals x(t) are statistically independent and reproduce the absolute value of the normalized source-signals.

Two algorithms can be employed:
an algorithm I using the moments of order 3,
an algorithm II using the cumulants of order 4, in particular with respect to narrow-band source-signals.

The calculation chain is composed of a cell C for calculating moments or cumulants. It possesses p inputs and the number of output thereof depends on the algorithm chosen. It is also composed of $$m = p \frac{(p-1)}{2}$$

"elementary rotators" $Q^{(1)}, Q^{(2)}, \ldots Q^{(j)}, \ldots Q^{(m)}$, associated in cascade with (m−1) multiplication cells X.

With each sampling period, that is to say with each arrival of p samples of signals s(t), the calculations are performed. These calculations are now described:

Algorithm I

Cell C performs the calculation of the moments $g_{ijk}$:

$$g_{ijk}' = a^2 . s_i(t) . s_j(t)^* . s_k(t) + b^2 . g_{ijk}$$

where the symbol (*) denotes the complex conjugate, and where the triple (i,j,k) describes the subset of $\{1, 2, \ldots p\}^3$ for which $i \leq j \leq k$.

In this expression, a and b are the omission factors. They are real numbers from ]0 to 1[ satisfying $a^2 + b^2 = 1$. It is possible to adapt a or b in order to adjust the power of the statistical averaging, and simultaneously the duration of the local stationarity exploited. For a small value of a, there will be much averaging, and the stationarity of the processes will be assumed to be lengthy (the equivalent equiweighted duration of averaging is of the order of $1/a^2$). For example, $0.01 \leq a \leq 0.05$ is reasonable.

Figure 3:
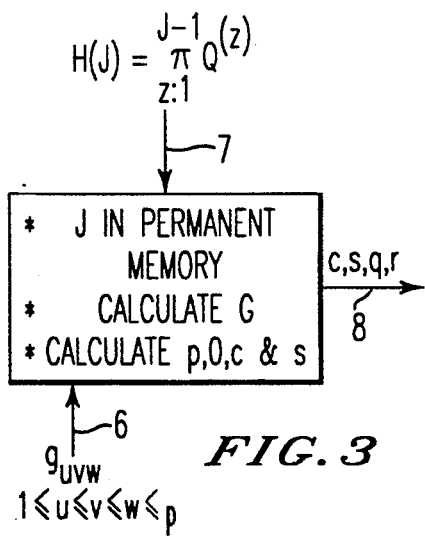
FIG. 3 is one of the elementary "rotation" cells used in the rotator of FIG. 2.

Cell $Q^{(j)}$ (see FIG. 3) has the role of evaluating the two numbers, c and s, characterizing the elementary rotation matrix Q(q,r), denoted $Q^{(j)}$ for simplicity. When $1 \leq q < r \leq p$, $p(p-1)/2$ pairs (q,r) are described, this corresponding to $p(p-1)/2$ elementary rotators. Choosing a description of rows, $Q^{(1)} = Q(1,2)$, $Q^{(2)} = Q(1,3), \ldots Q^{(p)} = Q(1,p), Q^{(p+1)} = Q(2,3), \ldots$ This clearly establishes a bijective relationship between J and the pair (q,r).

In FIG. 2, the lower wire 6 therefore transports the values of the cumulants of the inputs $s_i(t)$ whereas the value of the cumulative matrix $H(J) = Q^{(J-1)} \ldots Q^{(2)} Q^{(1)}$ travels on the top wire 7, and the output from each cell $Q^{(j)}$ appears at 8. The unit matrix is applied to the first cell at 9.

With the aid of the information coming from the top wire 7 and from the bottom wire 6 (cf. FIG. 3), the updating of the 4 cumulants $G_{qqq}, G_{qqr}, G_{qrr}$, and $G_{rrr}$ is firstly performed in cell $Q^{(J)}$ through the formula:

$$G_{ijk} = \sum_{u,v,w=1}^{3} H_{iu} H_{jv}{}^* H_{kw} g_{uvw}$$

Once this updating is completed (it will be rapid since many of the $H_{jv}$ are null or equal to 1), the cell will evaluate two numbers, c and s, defined by:

$$\frac{1}{\sqrt{1 + |\theta|^2}} \text{ and } \frac{\theta}{\sqrt{1 + |\theta|^2}} \text{ with } \theta = |\theta| \exp[j \arg\{\theta\}]$$

after calculating $\theta$ in the manner described below:

If: $|G_{qqr} + G^*_{qrr}| > |G_{qqr} - G^*_{qrr}|$, calculate $\rho =$ $$G_{qqq} - G_{qrr} - G^*_{rrr} + G^*_{qrr}]/(G_{qqr} + G^*_{qrr}),$$

If: $|G_{qqr} + G^*_{qrr}| < |G_{qqr} - G^*_{qrr}|$, calculate $\rho =$

-continued $$G_{qqq} - G_{qrr} + G^*_{rrr} - G^*_{qqr}]/(G_{qqr} - G^*_{qrr}),$$

Then calculate $$|\theta| = (-1)^k \frac{|\rho|}{2} + \sqrt{\frac{\rho\rho^*}{4} + 1}, \; arg\{\theta\} = arg\{\rho\} + k\pi.$$

(k being equal indifferently to 0 or 1).

Figure 4:
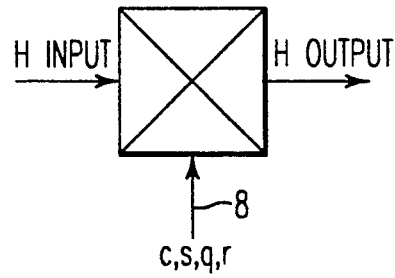
FIG. 4 is one of the "product" cells used in this same rotator.

Cell X produces the product of the matrix described by the data coming from the bottom at 8, times the matrix pxp coming from the left (cf. FIG. 4). Two numbers, c and s, arrive from the bottom on the lower input of the cell, as well as two indices, q and r. The matrix delivered at output (on the right of the cell) is defined by $H_{output} = Q^{(J)}H_{input}$, where the matrix $Q^{(J)}$ differs from the unit matrix only in four coordinates:

$$Q^{(J)}(q,q)=c, Q^{(J)}(q,r)=s, Q^{(J)}(r,q)=-s^*, \text{ and}$$

$$Q^{(J)}(r,r)=c, \text{ with } 1 \leq q \leq r \leq p.$$

This cell does fairly little work since most of the rows of $Q_{input}$ are unchanged in the calculation $H_{output}=Q^{(J)}H_{input}$ (only two of them need be calculated).

The last cell X provides the matrix Q which corresponds to $$H_{(m+1)} = \prod_{z=1}^{m} Q_{(z)}$$

Algorithm II

Cell C calculates the quantities:

$$M_{hijk} = a^2.s_h(t).s_i(t)^*.s_j(t).s_k(t)^* + b^2.M_{hijk},$$

with $1 \leq h \leq i \leq j \leq k \leq p$, $$M_{jk} = a^2.s_j(t).s_k(t)^* + b^2.M_{jk},$$

with $1 \leq j \leq k \leq p$.

Then the cumulants:

$$g_{hijk} = M_{hijk} - M_{hi}M_{jk} - M_{hj}M_{ik} - M_{hk}M_{ij}$$

are calculated.

We note that if the observations are complex and have been obtained after FOURIER Transformation of real signals, these observations satisfy the property termed "circularity" which implies that $M_{hj}=0$ and $M_{ik}=0$. It is therefore possible to forgo calculation of these terms. Furthermore, if the decorrelator operates correctly, it should in a steady state enforce $M_{jk}=0$ if $j \neq k$ and $M_{jj}=1$ if $j=k$. If the means of calculation are modest, it will also be possible for these terms to be replaced by their ideal value at the cost of a slight decrease in the speed of convergence.

With the aid of the information coming from the top wire and from the bottom wire, the updating of the 3 cumulants $G_{qqqr}$, $G_{qqrr}$, and $G_{qqqr}$ [sic] is firstly performed in cell $Q^{(J)}$ through the formula:

$$G_{ijkl} = \sum_{s,u,v,w=1}^{4} H_{is} H_{ju}^* H_{kv} H_{lw}^* g_{suvw}$$

As previously, the two numbers c and s are nest evaluated after calculating $\theta$ in the manner described below:

If $|G_{qqrr}| > 20.a^2.M_{qq}.M_{rr}$ calculate
$\rho = [G_{qqqr} - G_{qrrr}]/G_{qqrr}$ else $\rho = 0$.

Then $$|\theta| = (-1)^k \frac{|\rho|}{2} + \sqrt{\frac{\rho\rho^*}{4} + 1}, \; arg\{\theta\} = arg\{\rho\} + k\pi.$$

c and s are deduced from $\theta$ through $$c \frac{1}{\sqrt{1+|\theta|^2}} \text{ and } s = \frac{\theta}{\sqrt{1+|\theta|^2}}$$

Referring now to the graphs of results obtained (FIGS. 5 to 7), the numbers of samples are plotted as abscissae on these graphs, and the signal amplitudes as ordinates.

The three source-signals (FIG. 5) are, in this stimulation, composed of noise 10, a sawtooth signal 11, and a sinusoid 12.

The three signals 13, 14, 15 actually observed are represented in FIG. 6: they have no resemblance to the source-signals of FIG. 5.

After processing by the separator which has just been described, this separator using the algorithm II in this example, the three signals 16, 17, 18 represented in FIG. 7 are obtained. These three signals are obtained for $1/a^2 = 100$.

Note that these signals are obtained on non-corresponding channels, and apart from the sign, this not being a very big disadvantage. The sinusoid 12 is obtained at 16, on the first channel instead of the third, and with opposite sign. The noise 10 is obtained at 17, on the second channel instead of the first, and with opposite sign, and the sawtooth 11 is obtained at 18, on the third channel instead of the first and without reversal of sign.

The signals which correspond to the sinusoid and to the noise are obtained with a change of sign.

Among the advantages of the invention as compared with the other prior art can be cited:
  equally good operation in regard to real signals as in regard to complex signals,
  the possibility of operation when the number of sources is less than or equal to p;
  the possibility of using 2 algorithms, one of order 3, the other of order 4; only algorithm II operates in respect of narrow-band signals,
  the real-time operation made possible by virtue of a single calculation of $G_{ijk}$ or $G_{ijkl}$, even when p>2,
  the use of a conditioning test (algorithm I) or of a break-even threshold (algorithm II) in each of the elementary rotators: see the conditions regarding G for the calculation of $\rho$.

Among the novel applications made possible by virtue of this method, it is expedient to note:
  blind noise reduction:
  solution performing an analysis by independent components;

high-performance processing if the noise is Gaussian and the signal non-Gaussian;

the processing operates on all real signals whose statistics are known;

no recourse to lone noise or lone signal references;

location by sonar or radar:

on disturbed or uncalibrated antennae;

elimination of strong jamming sources very similar to the useful signal, or even of exactly identical statistics (the separator is capable of separating processes of like statistics); identification of a "cocktail-party";

separation of uncorrelated multiple paths;

location of p sources with p sensors;

estimation of an unknown signal received on an unknown antenna;

blind equalization (application to telecommunications in particular).

As will be apparent, the invention is not limited to the exemplary embodiment which has just been described, but on the contrary it is well able to be employed in other embodiments using equivalent means, even if they are more sophisticated.

I claim:

1. A method for separating signals in real-time, said signals being received by a predetermined number of sensors and which are separated from a linear mixture having an unknown transfer function into a plurality of source-signals less than or equal to said predetermined number of sensors, said source-signals being produced from independent and, except for one of them, non-Gaussian sources, said method comprising the steps of:

obtaining a plurality of decorrelated signals equal to number to said predetermined number of sensors from said signals to be separated; and calculating an orthogonal matrix using a rotator element which comprises a plurality of cascade connected elementary rotators which together produce said orthogonal matrix, said orthogonal matrix being equal to the required source signals divided by said plurality of decorrelated signals, wherein said orthogonal matrix effects a linear transformation from successive polynomial transformations of said decorrelated signals and is determined using a stochastic algorithm which stores average statistics and which uses said average statistics to effect the real-time determination of said orthogonal matrix.

2. A method for separating signals according to claim 1, wherein said step of calculating said orthogonal matrix includes inputting adjustable omission factors into said calculation step.

3. An apparatus for performing a real-time separation of signals, wherein said signals are received by a predetermined number of sensors and which are separated from a linear mixture having an unknown transfer function into a plurality of source-signals less than or equal in number to said predetermined number of sensors, comprising:

a decorrelator-conditioner for providing, on p outputs, p decorrelated signals s(t) from p received signals e(t) which are applied to said decorrelator-conditioner on its p inputs; and a rotator element, comprising a plurality of cascade connected elementary rotators which together produce an orthogonal matrix, said rotator element receiving on the p outputs of said decorrelated signals s(t) from said decorrelator-conditioner and which performs the calculation of an orthogonal matrix Q, in order to thereby provide, on its p outputs, the desired source-signals x(t) using the formula $x(t)=Q.s(t)$.

4. An apparatus according to claim 3, wherein said rotator element includes a cell for calculating moments or cumulants, said cell receiving the p signals s(t) form said decorrelator-conditioner and leaving on $m=p(p-1)/2$ elementary rotators associated in cascade with $(m-1)$ multiplication cells (X), the output (Q) from the last multiplication cell being applied to a cell (F) performing the product of the output, which represents the required orthogonal matrix (Q), multiplied by the p decorrelated input signals s(t).

* * * * *